Feb. 12, 1957     F. M. JONES     2,780,923
METHOD AND MEANS FOR PRESERVING PERISHABLE
FOODSTUFFS IN TRANSIT
Filed Jan. 14, 1952     3 Sheets-Sheet 1
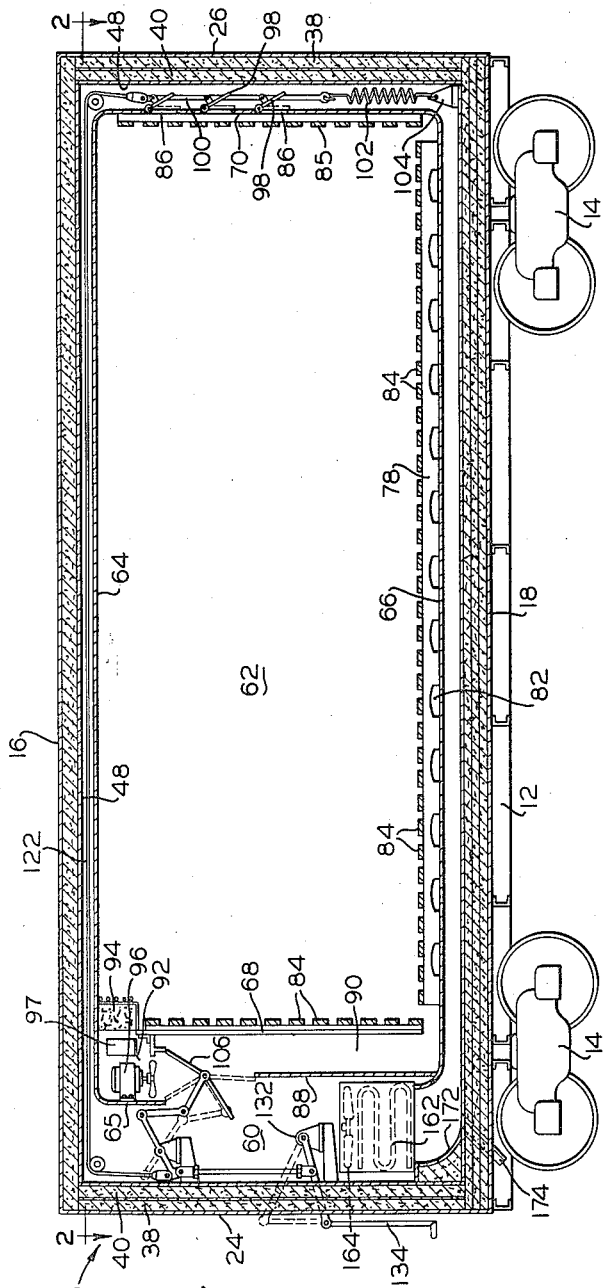
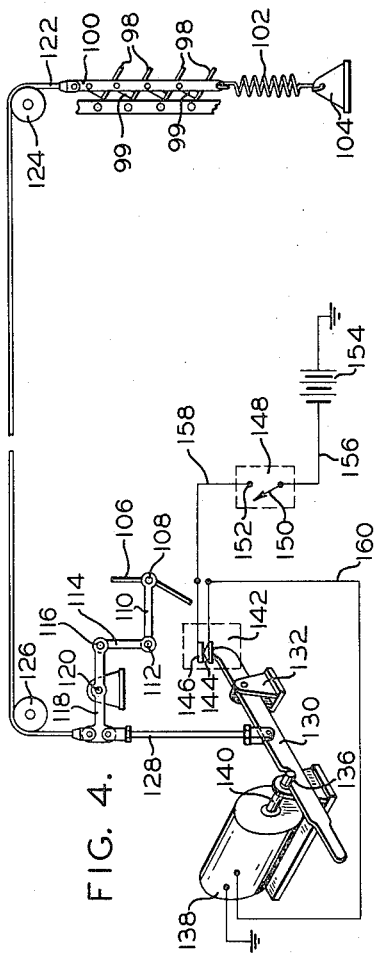
*INVENTOR.*
FREDERICK M. JONES
BY *Whiteley & Caine*
ATTORNEYS Feb. 12, 1957  F. M. JONES  2,780,923
METHOD AND MEANS FOR PRESERVING PERISHABLE
FOODSTUFFS IN TRANSIT
Filed Jan. 14, 1952  3 Sheets-Sheet 2
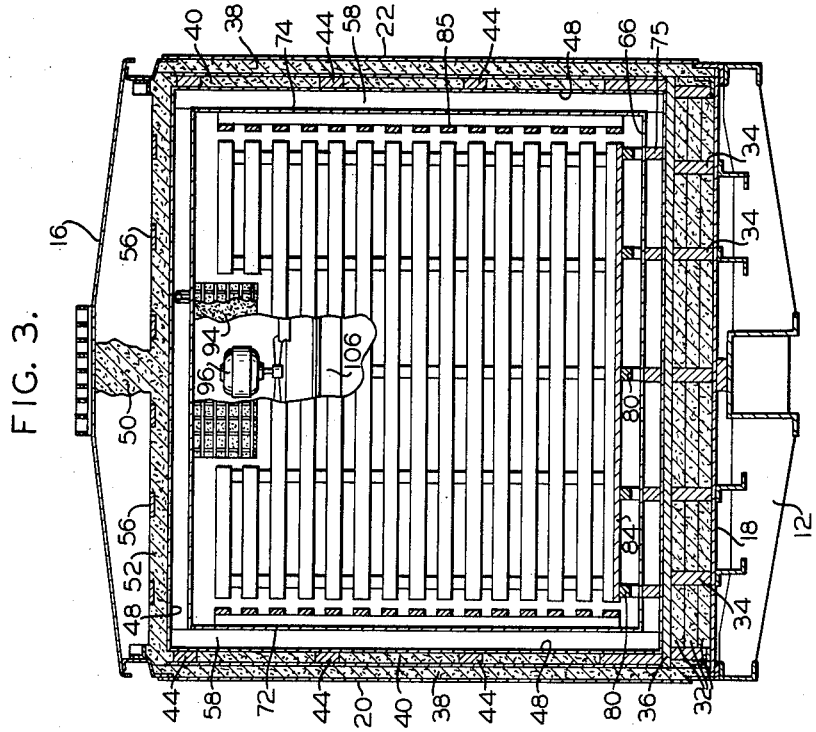
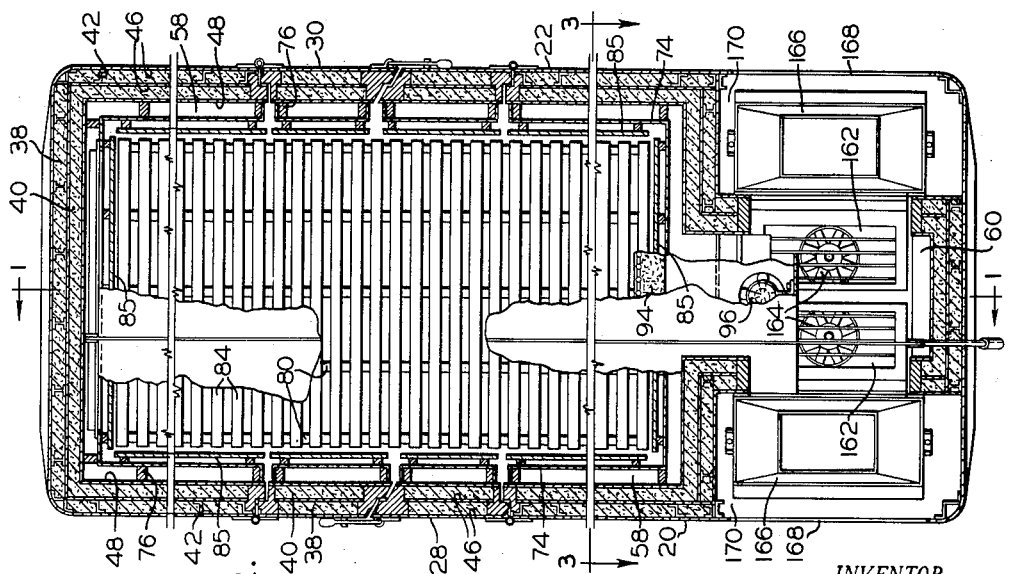
INVENTOR.
FREDERICK M. JONES
BY
*Whiteley & Caine*
ATTORNEYS Feb. 12, 1957  F. M. JONES  2,780,923
METHOD AND MEANS FOR PRESERVING PERISHABLE
FOODSTUFFS IN TRANSIT
Filed Jan. 14, 1952  3 Sheets-Sheet 3
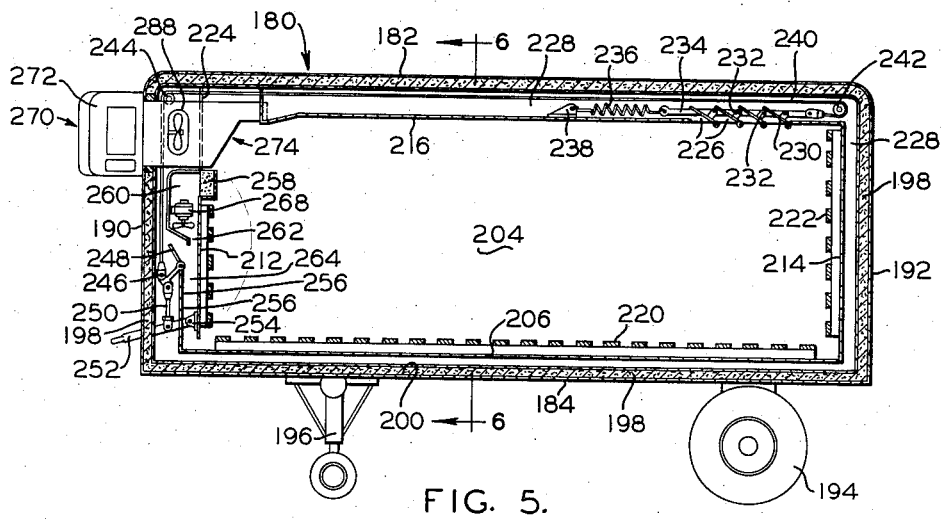
FIG. 5.
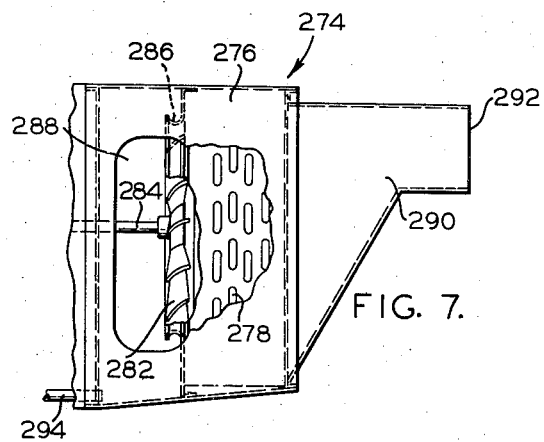
FIG. 7.
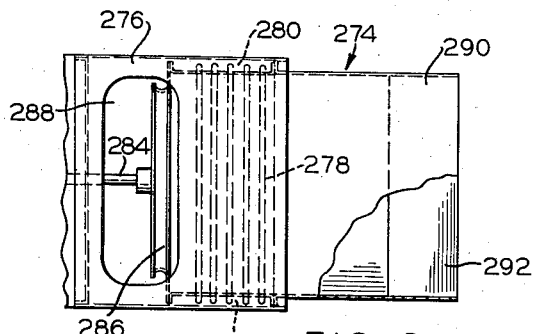
FIG. 8.
FIG. 6.
*INVENTOR.*
FREDERICK M. JONES
BY
*Whitely & Caine*
ATTORNEYS

2,780,923

METHOD AND MEANS FOR PRESERVING PERISHABLE FOODSTUFFS IN TRANSIT

Frederick M. Jones, Minneapolis, Minn., assignor to Thermo King Corporation, a corporation of Minnesota Application January 14, 1952, Serial No. 266,389

9 Claims. (Cl. 62—2)

My invention relates to an improved method and means for storing and transporting highly perishable foodstuffs such as fresh produce and the like. In general the invention is concerned with providing more perfect atmospheric conditions with respect to temperature, humidity, and other atmospheric conditions necessary for preserving perishable foods such as fresh produce, between the times of harvesting and distribution. More particularly it is concerned with the construction of transport vehicles such as trucks and railway cars and a mode for controlling atmospheric conditions therein to preserve the natural body and flavors of fresh produce.

The invention constitutes a modification of my prior invention disclosed in my copending application Ser. No. 136,952, filed January 5, 1950, now Patent No. 2,696,086, dated December 7, 1954.

The importance of controlling the temperature of the space within which fresh produce is stored and transported has long been recognized, but I have found that without controlling other atmospheric conditions, principally humidity, temperature control is meaningless. Losses sustained in the fresh produce industry, and principally during the transportation of produce from points of origin to distant markets, amount to substantially 20% of the total value of the produce handled. While improper temperature control may be the cause of a part of the spoilage, molds and fungus are also a cause of considerable spoilage, and these parasites develop even when adequate cooling has been provided by reason of the produce being maintained in a condition of excessive humidity. On the other hand, a great deal of produce is depreciated in value because of the lack of sufficient moisture in the atmosphere, and results in withering of the produce.

It is now generally recognized that in the absence of refrigeration, produce not only undergoes bacterial decomposition, but also undergoes a natural respiratory process in which oxygen is absorbed, and moisture and carbon dioxide is given off. When fresh produce is placed in a storage space or refrigerator car, and cold air is passed over the produce, evaporation will occur. The evaporative process in and of itself produces a cooling effect, but it must be carefully controlled so as not to exceed the rate of natural respiration. If moisture is not removed as rapidly as it is evolved from the fresh produce, the outer surface becomes damp enough to readily support the growth of the fungus and molds, whereas if the respiratory moisture is removed too rapidly "windburn" occurs and results in shriveling of the surface or skin of the produce. Moreover, since carbon dioxide is evolved with moisture, this should also be removed, since in the case of extremely delicate produce such as strawberries, the presence of excessive amounts of this gas tends to change the flavor of the fruit.

Generally speaking, when product has been cooled sufficient to inhibit bacterial action the respiratory process is correspondingly reduced and therefore precooling is important. In the instance of freshly harvested produce, the field heat should be removed as quickly as possible without damage, and this is best accomplished by circulating refrigerated air through the storage space and in direct contact with the products to uniformly refrigerate them and also remove the evolving moisture. However, as soon as the products have been properly precooled, the direct contact with the circulated air should be permanently stopped during the remainder of the transit period to prevent dehydration. In the instance of products that may have already been cooled, the direct circulation of air may be minimized to the extent of merely assuring a desirable transit temperature, whereafter, as in the case of freshly harvested products, the circulation of refrigerating air should be terminated by substantially sealing the space within which the products are stored.

In addition to refrigerating the products, it is also desirable to establish an optimum moisture content of the air sealed in contact with the products, and also to control the oxygen and carbon dioxide content thereof. With respect to the gaseous content of the atmosphere, the specific goods transported will be the controlling factor, and the atmosphere should be varied accordingly. Normally the ratio between oxygen and carbon dioxide should remain the same as in normal air, but the total amount of these gases should be reduced. The desired moisture content of the atmosphere is also a factor that will vary with different products and the amount in the space can be controlled by rapidly precooling the cargo space and the products, and then sealing the space and the products from the circulated air so that moisture evolved thereafter will raise the relative humidity in the space surrounding the products.

Heretofore natural water ice has been the principal means for refrigerating produce during transport from the points of origin to distant markets, and is not satisfactory because the rate of cooling is very slow and also the vapor pressures of ice and moisture are so closely related as to cause precipitation or at least the development of a saturated condition.

Because water ice has not been completely satisfactory, it has been a general custom to add a certain amount of salt to the ice to reduce temperatures and eventually form a brine solution. It has also been customary to provide an air circulating means, such as a fan driven from the car axle or by other means, to circulate the air in the storage space, passing the air over the brine, and thence over the produce. Continued circulation is likely to produce freezing, and because of the saline character of the brine, causes a continuous transfer of moisture from the produce to the brine. If circulation is terminated, either freezing or stratification results, and presents the same problems mentioned in connection with the use of ice.

If mere mechanical refrigeration and no more is used, or the brine is circulated through a coil, moisture in or on the produce passes to the evaporator or brine coils in amounts depending on the rate at which air is circulated, presenting the likelihood of windburn if the rate of air movement is excessive, or stratification if the rate of air travel is insufficient. The danger of stratification lies not only in wide variations of temperature but also wide variations in humidity.

I have found that in the case of storing or transporting fresh produce, that if the produce can be quickly precooled by circulation of refrigerated air to at least the maximum storage temperature and thereafter the produce can be sealed within a closed space and maintained in a humidity low enough to inhibit bacterial action, i. e. 65–98% of saturation depending on the particular product, a substantially ideal storage condition exists. When properly pre-cooled and sealed, the storage space as a whole must be maintained within the desired temperature limits, but this may be easily accomplished by externally cooling the sealed storage space. To prevent stratification during prolonged periods of storage, the atmosphere within the sealed space should be gently circulated. In many instances the type of gases which are in contact with the food are important to its flavor and keeping qualities and therefore I may provide one or more devices for changing the atmospheric content such as an ozonator, an oxygen destroyer and a carbon dioxide absorber.

To accomplish the desired result I provide a main body which is thoroughly and adequately insulated against heat leakage and the entry of outside atmosphere. Within the main structure I provide a produce chamber composed of material having a low thermal drop therethrough which is spaced from the main structure so as to provide for the circulation of air about substantially all of the outer surfaces of the chamber. An air conditioning means is contained within a compartment that is connected by suitable passages with the interior of the chamber as well as the enclosed outer surrounding space. Suitable dampers are situated in some of the passages to direct the conditioned air through the cargo space to pre-cool the cargo and thereafter to seal the cargo chamber and direct the conditioned air about the outer surfaces of the chamber to externally cool the sealed chamber, and by a "cold wall" effect, absorb heat given off by the produce. A small fan may be provided within the sealed space to gently circulate the air through defined passages to prevent stratification and to bring the enclosed air into contact with the walls of the chamber whose outer surfaces are cooled by the air conditioning means.

In the case of railway cars, the operation of the dampers should at least be partially automatic so that when loaded, the car may be dispatched immediately and without waiting for the load to be pre-cooled and the subsequent readjustment of the dampers at the point of loading. It is preferable therefore that the arrangement provide for moving the dampers to one position manually to permit pre-cooling, and when the controlled space has reached the desired temperature that the dampers be readjusted by a control system to terminate circulation of air between the mechanical cooling means and the load. Still further the damper control system should be arranged to prevent its being tampered with by unauthorized persons while the car is in transit.

An object of the invention is to provide a method of both precooling and refrigerating perishable products in transit by loading the products into a jacketed chamber whose surfaces are composed of material having a low thermal drop therethrough, which chamber is surrounded by an integral air duct in which refrigerated air is circulated, passing some of the circulated air through the chamber in one or more short circuit paths for one continuous period until the space or products are precooled, thereafter permanently terminating the circulation of air between the duct and the interior of the chamber for the remainder of the transit period while continuing the circulation of air within the duct about the exterior of the chamber to maintain the products at reduced temperature only by thermal transfer through the surfaces of the enclosure.

Another object is to provide a method of treating and preserving fresh perishable food products by loading the products within an isolated enclosure whose surfaces are composed of material having a low thermal drop therethrough, which enclosure is confined in a body of enveloping conditioned air that is forcibly circulated about the outer surfaces of the enclosure, and in which the enclosure is provided with damper controlled openings forming communication with the circulated air, passing some of the circulated air through the damper controlled openings until the products have been initially cooled to a predetermined lower temperature, whereafter the damper controlled openings are permanently closed to terminate the interchange between the conditioned air and the products and permit the latter to continue their respiratory process at the lowered temperature in a cooled isolated atmosphere.

Another object is to provide a method of treating and preserving perishable fod products in transit, which in addition to the steps set forth above includes an additional step of regulating the atmosphere in contact with the product to raise or lower the oxygen content of the atmosphere to increase the keeping qualities of the products.

Another object is to provide a conditioned air transport vehicle containing an isolated cargo chamber about which conditioned air is circulated, said chamber containing damper controlled openings for controlling the flow of conditioned air through the chamber, together with construction within the chamber to circulate the conditioned air entering the damper controlled openings in one set of diverse paths to pre-cool the product, and when the dampers are closed to circulate the air within the chamber in other diverse paths to prevent stratification of the air in contact with the product.

A further object is to provide in a transport vehicle containing an isolated cargo chamber about which conditioned air is circulated and provided with damper controlled openings for admitting circulated air into the chamber, temperature responsive means capable of permanently closing the dampers when the temperature has been initially reduced to a predetermined lower temperature, together with safety means which assures that the dampers cannot thereafter be accidentally latched in an open position.

Other and further objects may become apparent from the following specification and claims and in the appended drawings in which:

Fig. 1 is a longitudinal section through a railway car taken on line 1—1 of Fig. 2, looking in the direction of the arrows;

Fig. 2 is a plan view taken on line 2—2 of Fig. 1, showing parts in section and other parts broken away;

Fig. 3 is a vertical section taken on line 3—3 of Fig. 2, looking in the direction of the arrows;

Fig. 4 is a schematic showing of the damper control mechanism illustrated in Figs. 1, 2 and 3;

Fig. 5 is a longitudinal section of a highway carrier, showing a modification of the invention illustrated in Fig. 1;

Fig. 6 is a vertical section taken on line 6—6 of Fig. 5, looking in the direction of the arrows;

Fig. 7 is an enlargement of a portion of the structure shown in Fig. 6 with parts broken away to show interior construction; and, Fig. 8 is a plan view of the construction shown in Fig. 7 with parts broken away to show interior construction.

Referring now to the several figures of the drawing, the invention will be described in detail. General reference numeral 10 indicates a railway car intended primarily for the transportation of perishable foodstuffs. As seen in Figs. 1 and 3, the car contains an under carriage 12 and the conventional trucks 14 which support the vehicle for mobility. The vehicle body consists of an outer shell composed of a top wall 16, a bottom wall 18, side walls 20 and 22, and end walls 24, 26. As clearly shown in Fig. 2, the side walls 20 and 22 are provided with cargo doors 28 and 30.

As best seen in Fig. 3, the bottom wall 18 of the shell supports multiple layers of thermal insulation 32 that extend between a multiplicity of longitudinal stringers 34 and over which is a floor surface 36. The side and end walls also carry multiple layers of thermal insulation designated at 38, 40. The layer 38 is internally supported by a plurality of vertically extending Z-bars 42 while the inner layer 40 is supported by a plurality of longitudinally extending members 44. The outer and inner surfaces of the layers of insulation 38 and 40 are coated by an air impervious layer 46 which may be sprayed and consists of a suitable elastic which withstands wide variations in temperature without damage. Surrounding the inner side of the second layer of insulation 40 is a layer of plywood 48 which forms a smooth surface on the inner side of the insulation. The top 16 of the shell carries a heavy layer of insulation 50 and beneath it a second layer of insulation 52 which is reinforced by longitudinally extending members 56. The plywood walls 48, heretofore described as surrounding the inner sides of the lateral insulating layers, also extends across the top of the underside of layer 52 and with the floor 36 completely encases the several layers of insulation.

Regardless of the type or number of layers of insulation, and the type of sealing compound which may be used, the important factor is to provide a moisture impervious seal between the inner surface of the shell and the outer surface of the insulation, and what I am seeking to accomplish is to prevent moisture from any outside source to gain admission to the inner space designated at 58.

As clearly shown in Fig. 2, the lateral layers of insulation at one end of the body form a bay or compartment 60 which is in communication with space 58.

Within the space 58 is a cargo chamber designated by the general reference numeral 62 and composed of a top wall 64, bottom wall 66, end walls 68 and 70, and side walls 72, 74 all composed of material having a relatively low thermal drop therethrough. The bottom wall 66 is held in spaced relation to the floor 36 by a multiplicity of longitudinally extending stringers 75. The side walls are held in spaced relation from the plywood layer 48 by a plurality of vertically extending spacers 76. While not shown, spacers extend between the top wall 64 and the underside of the horizontal plywood layer 48. By this arrangement it will be noted that the cargo chamber 62 is held in spaced relationship from each of the inner surfaces of the insulating layers to form a channel or air space about the cargo chamber.

Within its interior the cargo chamber 62 carries a floor rack 78 composed of a plurality of longitudinally extending stringers 80, each of which has several lateral openings 82 therein to permit air to flow laterally beneath the floor rack 78. The upper surface of the floor rack is composed of a plurality of spaced members 84. At its ends and sides, the cargo chamber also carries wall racks 85 to permit the flow of air through and about the cargo. The end wall 70 contains a plurality of openings 86 that form communication between the interior of the chamber 62 and the outer channel or space 58. As will be best seen in Fig. 1, a false wall or partition 88 separates the compartment 60 from the end of the cargo chamber, but the partition 88 is spaced from the end wall 68 so as to form a channel 90, which, as will be clearly evident, is in communication with the space within the cargo chamber 62 beneath the floor rack 78 and may also communicate with compartment 60. Supported by the upper portion of wall 68 and a part 65 of the top 64 is a duct 92 that contains a filter 94. Within the duct 92 is a motor operated fan 96. Designated by reference character 97 is an electrically operated air modifying device which may be either an ozonator or an oxygen consumer.

Cooperable with the several openings 86 are a plurality of movable dampers 98 that are connected by pivotal links 99 to an operating rod 100. A heavy coil spring 102 which is anchored at 104 is connected to rod 100. Cooperable with the partition 88 and duct cover 65 is an angular shaped damper 106. The dampers 98 and 106 are connected together by a single operating means shown in detail in Fig. 4.

Referring to Fig. 4, damper 106 is supported for pivotal movement at 108 and carries a rod 110 that is pivoted at 112 to one end of a link 114. At its other end link 114 is pivoted at 116 to a lever 118 that rotates about a pivot 120. A cable 122 which is connected at one end to the rod 100 extends over suitable pulleys 124, 126, and at its other end is connected to the outer end of the lever 118. A second cable 128 extends from the outer end of lever 118 to a lever 130, which as shown in Fig. 1, is positioned within the compartment 60 and supported for pivotal movement by a bracket 132. As best seen in Fig. 1, the outer end of lever 130 penetrates one end of the compartment 60 and the outer shell and at its outer extremity is connected to a rod 134 which is on the outside of the vehicle body and may if desired be covered by a suitable locking door or other enclosure, not shown. Lever 130 is provided with a notch 136 in its upper surface.

Associated with lever 130 is a control system for latching and releasing the lever, and which is effective to prevent it from being accidentally latched when the latter action would be harmful to the load. A solenoid operator 138 is provided with an outwardly biased spring plunger 140 that is adapted to engage the notch 136 in lever 130. A switch 142 is positioned in line with the inner end of lever 130 and carries a movable contact 144 that is adapted to engage a stationary contact 146 when the outer end of lever 130 is pulled downwardly to open dampers 98 and 106. A thermostatic switch 148, that would normally be situated within the cargo chamber 62, is composed of a movable blade 150 and a stationary contact 152. This switch would normally be open when the temperature is above the desired limits, but would close when the temperature descends within limits. A battery 154 is connected at its positive pole to a conductor 156 that extends to blade 150. A conductor 158 extends from contact 152 to contact 146. A conductor 160 extends from contact 144 to one pole of the solenoid 138, whose other pole is connected to ground, thus completing the circuit to the battery.

Within the compartment 60, as shown in Fig. 1, is a refrigerant evaporator or heat exchange unit 162 of a mechanical refrigerating system. A circulating fan 164 is positioned above the evaporator 162 and serves to drive air downwardly over the evaporator.

As shown in Fig. 2, there are two evaporator units 162 each being associated with a separate mechanical portion, not shown, but housed within hoods 166. As more fully disclosed in my copending application Ser. No. 136,952, each of the units is made removable and may be inserted or withdrawn through doors 168. It will be noted that the machinery portion of each of the units, including the hoods 166, is contained within machinery compartments 170 that are thermally isolated from the compartment 60 as well as from cargo chamber 62.

As shown in Fig. 1, beneath the evaporators 162 is shown a sheet metal duct 172 that extends to the space beneath the cargo chamber 62. Extending from the bottom portion of duct 172 is a trap type drain pipe 174 for draining condensate resulting from the cooling of moist air.

The operation of the invention disclosed in Figs. 1–4 will now be explained. Assuming that the car has not been pre-cooled, the mechanical refrigerating units are placed in operation, but this forms no part of the present invention. In pre-cooling, the first step is to open the dampers by pulling down on the outer end of lever 130. This action causes dampers 98 to open and damper 106 to assume the full line position. When lever 130 is in its lowest position the spring biased plunger 140 will engage in notch 136 and will latch the lever. Movement of lever 130 closes switch 142, but because the thermostat 148 is unsatisfied, switch 150 is away from contact 152 and therefore the circuit from battery 154 to solenoid 138 is broken, and therefore lever 130 will be latched with the dampers open.

With the refrigeration apparatus in operation, air is driven from the compartment 60 downwardly over the coils 162 and thence under the bottom floor 66 of the chamber 62 where it will move longitudinally beneath the cargo chamber and laterally and vertically about the sides of the top of the chamber and into the space or channel 58 above the top of the chamber where it will cool the walls of chamber 62 and then return to the compartment 60 to be recirculated. A large portion of the cooled air passing under the floor 66 passes to the other end wall 70 flowing upwardly through the dampers which are now in an open position and with a small portion of the column of air passing into the space above the top of the chamber. The cooled air entering through the openings 86 will flow in and about the load and will then pass downwardly through the product into the openings in the floor racks 78 and pass longitudinally beneath the floor racks to the channel 90 whence it passes upwardly in contact with a wall 68 and the partition 88. With the damper 106 in an open position, as shown, it serves as a baffle and directs the air outwardly into compartment 60 where it is re-circulated by fan 164. Fan 96 would also be in operation, and while not as effective as fan 164, would nevertheless draw air from the top of the interior of the chamber 62, and this air would also pass into compartment 60.

After the cargo chamber has been loaded and the doors 28 or 30 closed, the pre-cooling operation will continue and the evaporator coils 162, being refrigerated to a very low temperature, will cool the air which is forcibly circulated through the products as well as the space 58 where the cooled air contacts the outer surfaces of chamber 62. It is highly desirable to pre-cool perishables as quickly as possible to thereby retard respiration and evaporation, and this is accomplished by controlling the rate at which the air is refrigerated by evaporator 162, through means which does not form a part of the present invention, but suffice to mention that the rate at which moisture is removed from the air passing over the heat exchanger is controlled so as to retain the amount of moisture which is necessary for the particular product being transported or stored. The actual humidity content which is optimum for various foods ranges from substantially 65% to 98% of the dew point.

Assuming the load to be fresh produce which has been recently harvested, it will contain field heat and as cooled through the respiratory process will consume a limited amount of oxygen from the atmosphere, giving off moisture and carbon dioxide. The moisture content of the atmosphere is controlled by the heat exchanger 162 and carbon dioxide may be removed by the filter 94 which contains soda lime or some other form of $CO_2$ absorber. In this manner both the oxygen and the carbon dioxide content of the air is reduced but the ratio between these gases will remain equal to their relationship in normal air.

Some products have their flavors enhanced by a high oxygen content of the atmosphere and when this is necessary the element represented at 97 may be an ozonator. Other products, particularly fats or meats, are best preserved in a low oxygen atmosphere and when that condition is desired, element 97 may be an oxygen consumer, such as an arc lamp or other device which is capable of consuming oxygen. The gas or gases composing the atmosphere in the cargo space should be beneficial to the product being transported. If both oxygen and carbon dioxide are undesirable, the proportions of these gases may be reduced and in that event element 97 would be an arc lamp or other oxygen destroyer used to convert some of the oxygen existing in the isolated atmosphere to carbon dioxide, and the soda-lime filter 94 would act to absorb the carbon dioxide thus formed, together with the smaller proportions of this gas evolving by respiration from the product. It follows that the conjoint action of the two elements would increase the total percentage of the residual nitrogen present in the isolated atmosphere. Nitrogen, being a neutral gas would not harm any product and would tend to reduce the rate of respiration by the product. Thus either a single device or a combination of devices may be used to change or modify the atmosphere that intimately contacts the food.

When the temperature within the cargo chamber reaches the desired low limit, the thermostat 148 will respond and blade 150 will engage contact 152 to establish a circuit from battery 154 to the solenoid 138 and retract the spring biased plunger 140 from the notch 136 in lever 130. Spring 102 which has been under tension will cause dampers 98 and 106 to rotate to a closed position, thereby substantially sealing the space within chamber 62 from space 58 and halting the circulation of air through chamber 62. When lever 130 has been rotated by the action of spring 102, its inner end moves away from switch 142, and contacts 144, 146 are separated, thereby de-energizing the solenoid 138 and permitting the plunger 140 to move out. The circuit is provided as a means of preventing accidentally re-latching lever 130. Thus as long as switch 150 engages contact 152, and lever 130 is pulled down to close switch 142, a circuit will be made to the solenoid 138 and lever 130 cannot be latched. It is assumed that the outer end of lever 130 would be suitably protected against tampering by unauthorized persons and the arrangement is provided to permit testing of the dampers to determine their position.

The control of the mechanical refrigerating units is entirely independent of the dampers, and these units or either one of them operate intermittently in response to the temperature within chamber 62. The fan 96 and element 97 are connected to the circuits of the mechanical units and operate when the units or either of them is in operation, but if necessary the fan 96 may be operated on battery current and can be continuously operated. When damper 106 is in the full line position fan 96 draws air upwardly through filter 94 and this air is discharged into compartment 60 in rear of the damper.

Assuming now that the dampers have closed and fans 164 and 96 are still operating. This is a normal condition because it is the intent and purpose of the invention that the mechanical units will continue to operate at least for a short time after the dampers have closed. When this occurs, a new circuit for the air is established. Within chamber 62 fan 96 will gently draw air from the top portions of the chamber which is now discharged through channel 90 between partition 88 and wall 68. The air which is now travelling in a reverse direction from the pre-cooling cycle passes under the floor racks 78 and thence upwardly between the spaced members 84 and the wall racks 85 to prevent stratification. It will also be noted that warmer air is travelling in a concurrent direction to the coldest air and will therefore prevent freezing the product adjacent the lower forward corner of the chamber and will tend to maintain a uniform temperature in chamber 62.

Since the mechanical refrigerating unit and fan 164 are operating, refrigerated air will be circulated in the space 58 exterior to chamber 62, thereby cooling the exterior of the chamber by conduction through the walls thereof. The mechanical unit is capable of intermittent operation whenever the temperature in chamber 62 rises above a predetermined limit, and thus there will be intermittent circulation of air both in and about the exterior of the chamber. The system which controls the operation of the mechanical unit is capable of modifying or reversing the refrigerant cycle and therefore in the event that the temperature descends below a safe limit the change-over occurs and mildly heated air is circulated through space 58. The system is also capable of intermittently defrosting evaporator 162 and any moisture thus removed can find exit through the drain trap 174.

Referring now to Figs. 5–8, the invention is shown in a slightly modified form. General reference number 180 indicates a truck or trailer body which is adapted to be propelled by means not shown. The body 180 consists of an outer shell having a top 182, a bottom 184, sides 186, 188, a front end 190 and a rear end 192. The cargo loading doors are not specifically shown but in general they would form the main portion of the rear end 192 of parts of either side 186, 188. The vehicle body is supported for movement on wheels 194, and when detached from the prime mover the body is partially supported by the foldable wheel structure indicated generally at 196.

Within the interior of the outer shell is one or more suitable layers of insulation 198, which is either impervious to air and moisture, or carries a moisture impervious layer 200 on its outer surface and between the insulation and the outer shell. As was emphasized with respect to the railway car, it is important that a moisture impervious seal exist between the inner surface of the shell and the outer surface of the insulation so that moisture from any source, including humidity in the air, cannot penetrate the shell since many forms of insulation are conductive to moisture. A layer of suitable material, such as plywood or the like, is secured to each of the inner surfaces of the insulation and is indicated generally at 202.

A cargo chamber 204 is mounted within the interior of the body 180 and is composed of a floor 206, side walls 208, 210, a front end wall 212, and a rear end wall 214. The top wall 216, as best seen in Fig. 6, has its lower surface tapering inwardly about the outlet end of an air conditioning device to be discussed hereinafter.

While not specifically shown, suitable spacing members are provided between each of the walls, and the plywood layer 202 and would permit circulation of air about the outer sides of chamber 204.

As best seen in Fig. 6, a plurality of spacers 218 extending longitudinally of the truck body support laterally spaced floor racks 220. Spaced racks 222 are carried on the end and side walls to space the cargo away from the walls to permit air to travel through and about the cargo. It should be particularly noted that the front end wall 212 extends from a short top wall portion 224 but its lower extremity is spaced from the floor 206 to form a passage which will be discussed hereinafter.

The top wall 216 of the cargo chamber contains a plurality of openings 226 which form communication between the interior of the cargo chamber 204 and a space designated generally at 228 which extends about all sides of the cargo chamber and is equivalent to the space 58 of the railway car. A plurality of dampers 230 associated with openings 226 to control air flow are connected by links 232 to a rod 234. At one end rod 234 is connected to a spring 236 which is anchored at 238. At its other end rod 234 is connected to a cable 240 which extends over pulleys 242, 244 to a pivotal connecting member 246 that supports a movable damper 248. A short cable 250 extends from the lower portion of member 246 to a lever 252 whose inner end is pivotally mounted on a bracket 254 that is supported on the forward side of wall 212. Beneath the damper 248 and extending the full width of the body is a partition 256.

Supported by wall 212 is a filter or absorber 258 whose inner side communicates with a duct 260. The lower portion 262 of duct 260 extends in the direction of wall 212 and above a channel 264 formed between partition 256 and the front cargo wall 212. A motor driven fan 268 is supported on the interior of duct 260. If desired an air modifier such as element 97 may also be mounted in the duct.

As best seen in Figs. 5, 7 and 8, is an air conditioning device indicated generally at 270 composed of a machinery portion 272 on the exterior of the front end wall 190 and an interior portion 274 shown in enlarged scale in Figs. 7 and 8.

Referring now to Figs. 7 and 8, portion 274 consists of a generally rectangular hollow casing 276 within which is mounted a refrigerant heat exchanger 278. As best seen in Fig. 8, the heat exchanger 278 is centrally disposed within the casing 276 but slightly spaced from each of the sides thereof, as indicated at 280. In front of the heat exchanger 278 is a fan 282 driven by a shaft 284 that extends from the mechanical portion 272. Surrounding the fan is a shroud 286. It will be noted by referring to Fig. 5 that the wall 212 encompasses the portion 274 along a line approximately parallel with the shroud 286 and in rear of openings 288 in the walls 276 so that air is drawn to the fan in front of wall 212. To the rear end of the rectangular casing portion 276 is secured an angularly extending funnel-shaped member 290 that terminates in an outlet opening 292 abreast the upper portion of the casing so that air discharged through the heat exchanger 278 is funnelled upwardly and discharged through a relatively narrow opening. A trap type drain pipe 294 extends from the lower forward portion of casing 276 for disposing of water resulting from defrosting or dehydration of air.

The operation of the structure shown in Figs. 5–8 is relatively similar to that shown in Figs. 1–4. During the precooling period lever 252 would be in the lower position shown in Fig. 5 and dampers 230 would be in an open position with respect to the openings 226 to permit a portion of the air from the air conditioning portion 274 to enter the cargo chamber 204, circulating through the produce and thence passing downwardly through the floor racks to the forward end of the chamber where the major portion will flow upwardly in front of wall 212 and through the opening provided by damper 248, whence the air is drawn into the openings 288 of the air conditioning portion 274 for recirculation. Since motor 268 would also be in operation, a portion of the air would be drawn in through the filter 258 and directed downwardly in rear of the lower portion 262 of duct 260 whence this air would also be drawn by the air conditioning device for recirculation. It should also be understood that a portion of the air delivered above the top of the chamber would pass through the space 228 about the outer sides of the chamber and since damper 248, when in the position shown in Fig. 5, does not close off the outer space 228, this air will also be continuously recirculated so that the cargo chamber 204 is being cooled on its interior as well as its exterior.

Although not specifically shown, the control system shown in Fig. 4 would be incorporated in the structure shown in Fig. 5 and when the temperature within the chamber 204 reached the desired lower limit, lever 252 would be released, thereby permitting spring 236 to effect the closing of dampers 230 and 248. Thereafter conditioned air would be circulated about the exterior surface of the cargo chamber, and fan 268 would now initiate a circulation of air within the interior of chamber 204 in a reverse direction, that is downwardly past the abutment 262 between the walls 212 and 256 under and beneath the floor racks 220, whence this air would again be drawn inwardly through the filter 258.

Considering now a portion of the mechanism shown in Figs. 7 and 8, it will be noted that the air is drawn into the heat exchanging portion in front of fan 282 so that mechanical heat resulting from the energy necessary to drive the fan is picked up by the heat exchanger 278, thus increasing the efficiency of operation. The sloping funnel-shaped member 290 draws all of the discharge air upwardly to the opening 272 where it may pass above the ceiling surface 216. Moreover, the arrangement of wall 212 causes the major portion of the air to pass downwardly beneath the lower limits of this wall, thereby creating an efficient circuit for the air. This arrangement contrasts from the disclosure of my Reissue Patent 23,000 where the air is drawn inwardly from the compartment through the rear of the heat exchanger and discharged through the top of the casing with the heat of the fan added to the discharge air.

Again it is emphasized that the insulation which is immediately inside of the shell must be impervious to moisture, or must be sealed against the passage of moisture, since it is of the greatest importance to prevent the entrance of moisture into the system from any source, including humidity in the air, as it is a purpose of this invention to control the moisture content of the air both within and surrounding the cargo chamber 204. If the load contained considerable moisture, this would either collect on the heat exchanger 278 in the form of frost, or would be precipitated from the atmosphere by contact with the cold surface. The mechanical unit is provided with means, not shown, for defrosting the heat exchanger and thus moisture from any source can be disposed of through the drain trap 294. The mechanical unit, while not disclosed here, operates intermittently in response to the temperature within chamber 204 and, as has been mentioned previously in connection with Figs. 1-4, is capable of maintaining the temperature within the cargo chamber within desired limits.

The advantages of my invention, in either form as disclosed herein, resides in the method and means of maintaining perishable products such as food in a nearly perfect atmosphere, controlling the temperature and humidity at the proper levels, and in providing means to prevent stratification.

Another highly important advantage resides in providing means for regulating the constituents of the atmosphere surrounding the food and in contact therewith.

As changes or modifications may be apparent to those skilled in the art, my invention is defined in the terms of the appended claims.

I claim:

1. In a method of treating and preserving fresh perishable food products in transit embodying loading the products within an enclosure whose surfaces are composed of material having a low thermal drop therethrough, confining a body of air which envelopes the enclosure and is substantially isolated from heat and moisture exchange with ambient atmosphere, forcibly circulating the confined body of air about the outer surfaces of the enclosure and in heat exchange relationship with a refrigerant heat exchanger exterior to the enclosure to effect cooling and dehydration of the confined body of air, passing a portion of the cooled dehydrated air through the interior of the enclosure and in contact with the products therein for one continuous period during the initial stages of transit to quickly reduce the temperature and rate of respiration of the products and concurrently remove moisture evolved therefrom, the improvement consisting of completely terminating the interchange of the circulated air with the products and the atmosphere within the enclosure when the temperature of the circulated air has been initially reduced to a predetermined lower temperature to isolate the products from the dehydrated air and permit the products to continue respiration at the lowered temperature within an isolated atmosphere for the remainder of the transit period to avoid further transfer of moisture from the products to the refrigerant heat exchanger, while continuing the circulation and cooling of the confined enveloping body of air that surrounds the enclosure whenever its temperature exceeds a predetermined maximum temperature to further minimize the respiratory process in the products by thermal transfer through the surfaces of the enclosure, and also absorb heat leakage from the ambient atmosphere.

2. In a method of treating and preserving fresh perishable food products in transit embodying the steps of loading the products within an enclosure whose surfaces are composed of material having a low thermal drop therethrough, confining a body of air which envelops the enclosure and is substantially isolated from heat and moisture exchange with ambient atmosphere, forcibly circulating the confined body of air about the outer surfaces of the enclosure and in contact with a refrigerant heat exchanger exterior to the enclosure to effect cooling and dehydration of the confined body of air, the improvement consisting of passing a portion of the cooled dehydrated air in diverse paths through the interior of the enclosure and in contact with the products therein for one continuous period during the initial stages of transit to quickly reduce the temperature of the products and concurrently remove moisture evolved therefrom, thereafter completely terminating the interchange of the circulated air with the products and the atmosphere within the enclosure when the temperature of the circulated air has been initially reduced to a predetermined lower temperature to thereafter isolate the products from the dehydrated air and permit the products to continue respiration at the lower temperature in an isolated atmosphere for the remainder of the transit period to avoid further transfer of moisture from the products to the refrigerant heat exchanger, and then circulating the isolated air within the enclosure in other diverse paths within the enclosure to establish a uniform condition of temperature and humidity of the isolated air and to bring said isolated air into contact with the interior surfaces of the enclosure to maintain its temperature at substantially the same temperature as the confined air enveloping the enclosure, while continuing the circulation and cooling of the confined enveloping body of air whenever its temperature exceeds a predetermined maximum temperature.

3. In a method of treating and preserving fresh perishable food products in transit embodying the steps of loading the product within an enclosure whose surfaces are composed of material having a low thermal drop therethrough, confining a body of air which envelops the enclosure and is substantially isolated from heat and moisture exchange with ambient atmosphere, forcibly circulating the confined body of air about the outer surfaces of the enclosure and in contact with a refrigerant heat exchanger exterior to the enclosure to effect cooling and dehydration of the confined body of air, passing a portion of the cooled dehydrated air through the interior of the enclosure and in contact with the product therein for one continuous period during the initial stages of transit to quickly reduce the temperature of the product and concurrently remove moisture evolved therefrom, the improvement consisting of completely terminating the interchange of the circulated air with the product and the atmosphere within the enclosure when the temperature of the circulated air has been initially reduced to a predetermined lower temperature to isolate the product from the dehydrated body of air and permit the product to continue respiration at the lowered temperature for the remainder of the transit period, circulating the isolated air within the enclosure to maintain a uniform condition of temperature and humidity of air in contact with the product, and treating the isolated air within the enclosure to reduce the proportion of gases therein deleterious to the keeping quality of the products, while continuing the circulation and cooling of the confined enveloping body of air whenever its temperature exceeds a predetermined maximum temperature to maintain the products at a desired temperature by thermal transfer through the surfaces of the enclosure, and also absorb heat leakage from the ambient atmosphere.

4. The method defined in claim 3 in which the isolated air is ozonated to retard bacterial and/or fungi growth in the product.

5. The method defined in claim 3 in which the isolated air is treated to convert a portion of the oxygen content to carbon dioxide and the carbon dioxide content is reduced to increase the proportion of nitrogen present in the atmosphere in contact with the product.

6. In a conditioned air transport vehicle embodying an insulated outer shell, a cargo chamber composed of walls formed of material having a low thermal drop therethrough supported within the shell and in spaced relation to the inner surfaces thereof to form an integral air duct within the shell and surrounding said chamber, a blower carried by the vehicle within the air duct for circulating the air within said duct, said blower disposed within said duct to form a low pressure zone on the outer side of one of the chamber walls and a high pressure zone on the outer side of another of said chamber walls, each of said last named walls containing an opening therein and constituting respectively an inlet and an outlet for circulated air with respect the duct and the interior of said chamber, a damper operatively associated with said inlet opening and being movable between open and closed positions, means for variably directing the air within said cargo chamber comprising a ventilated floor rack mounted within said chamber in spaced relation to the lower side thereof and forming an air passage along the lower limits of said chamber, a false wall mounted within the chamber in close proximity with said low pressure zone wall and with its lower limits extending in close proximity with the upper limits of said floor rack and forming a barrier between the inlet and outlet openings to divert the path of a portion of the air passing between said openings downwardly through portions of the floor rack before reaching the outlet opening when said damper is in an open position, said false wall containing an opening adjacent its upper limits, and a blower carried by said vehicle between the low pressure zone wall and said false wall and disposed to draw air from the chamber through the opening adjacent the upper limits of said false wall and discharge the same to the chamber and upwardly through portions of the floor rack when said damper is in a closed position.

7. In a conditioned air transport vehicle embodying an insulated outer shell, a cargo chamber composed of top, bottom and lateral walls all formed of material having a low thermal drop therethrough supported within the shell and in spaced relation to the inner surfaces thereof forming an integral air duct within the shell and surrounding said chamber, a blower carried by the vehicle within the air duct for circulating the air within said duct, said blower disposed within said duct to form a low pressure zone on the outer side of one of the chamber walls and a high pressure zone on the outer side of another of said chamber walls, each of said last named walls containing an opening therein and constituting respectively an inlet and an outlet for circulated air with respect the duct and the interior of said chamber, a damper operatively associated with each of said openings and being movable between open and closed positions, a ventilated floor rack mounted within the interior of the cargo chamber in spaced relation to the lower side thereof and forming an air passage along the lower limits of said chamber, a false wall mounted within the chamber in close proximity with said low pressure wall and with its lower limits extending in close proximity with the upper limits of said floor rack and forming a barrier between the inlet and outlet openings to divert the path of a portion of the air passing between said openings downwardly through portions of the floor rack before reaching the outlet opening when said dampers are in an open position, said false wall containing an opening adjacent its upper limits, a blower carried by said vehicle between said low pressure chamber wall and said false wall and disposed to draw air from the chamber through the opening adjacent the upper limits of said false wall and discharge the same to the chamber upwardly through the floor rack when said dampers are in a closed position, and air treating means supported in the path of travel of air with respect said last named blower for modifying the gaseous content of the atmosphere circulated within said chamber.

8. In a transport vehicle embodying an outer shell, a cargo chamber within the shell supported in spaced relationship to the inner surfaces of the shell to form a channel between the shell and the said chamber, said chamber having an opening forming communication between the channel and the interior of the chamber, a movable damper associated with said opening and normally biased to a closed position, a linkage connected to said damper, manually operable means connected to said linkage for moving said damper only to an open position, latching means cooperable with a portion of the linkage for holding said damper in an open position, and temperature responsive means operably connected to the latching means and being effective to release the latching means on a lowering of temperature in said chamber to a predetermined lower temperature, said last named means being effective to maintain the latching means inoperative when the temperature in said chamber is maintained at said predetermined lower temperature.

9. In a transport vehicle embodying an outer shell, a walled chamber within the shell supported in spaced relation to the inner surfaces of the shell to form a channel between the shell and the walled chamber, two spaced apart walls of the chamber each having an opening communicating with the channel, a damper associated with each of said openings and normally biased to a closed position, a linkage connecting said dampers, manually movable means connected to said linkage for moving the dampers only to an open position, latching means cooperable with a portion of the linkage for holding the dampers in an open position, and temperature responsive means operably connected to the latching means and being effective to release the latching means on a lowering of temperature in the walled chamber to a predetermined lower temperature, said last named means being effective to maintain the latching means inoperative when the temperature in the walled chamber is maintained at said predetermined lower temperature.

References Cited in the file of this patent

UNITED STATES PATENTS

| Number | Name | Date |
|---|---|---|
| Re. 23,000 | Jones | May 11, 1948 |
| 1,744,890 | Hanrahan | Jan. 28, 1930 |
| 2,107,400 | Stabbal | Feb. 8, 1938 |
| 2,224,819 | Hull | Dec. 10, 1940 |
| 2,285,946 | Kalischer | June 9, 1942 |
| 2,331,147 | Smith | Oct. 5, 1943 |
| 2,336,242 | Hanson | Dec. 7, 1943 |
| 2,380,386 | Crawford | July 31, 1945 |
| 2,501,141 | Plummer et al. | Mar. 21, 1950 |
| 2,529,734 | Lehman | Nov. 14, 1950 |
| 2,586,893 | Westling | Feb. 26, 1952 |
| 2,633,714 | Wehby | Apr. 7, 1953 |